US010363497B2

(12) United States Patent
Spiegelman et al.

(10) Patent No.: US 10,363,497 B2
(45) Date of Patent: Jul. 30, 2019

(54) DEVICES, SYSTEMS, AND METHODS FOR CONTROLLED DELIVERY OF PROCESS GASES

(71) Applicant: Rasirc, Inc., San Diego, CA (US)

(72) Inventors: Jeffrey J. Spiegelman, San Diego, CA (US); Christopher M. Ramos, Bonita, CA (US)

(73) Assignee: RASIRC, Inc., San Diego, CA (US)

( * ) Notice: Subject to any disclaimer, the term of this patent is extended or adjusted under 35 U.S.C. 154(b) by 108 days.

(21) Appl. No.: 15/437,892

(22) Filed: Feb. 21, 2017

(65) Prior Publication Data

US 2017/0239592 A1 Aug. 24, 2017

Related U.S. Application Data

(60) Provisional application No. 62/296,790, filed on Feb. 18, 2016.

(51) Int. Cl.
*B01D 53/22* (2006.01)
*B01D 19/00* (2006.01)
*B01D 63/06* (2006.01)

(52) U.S. Cl.
CPC ..... *B01D 19/0031* (2013.01); *B01D 19/0005* (2013.01); *B01D 63/068* (2013.01); *B01D 2325/42* (2013.01)

(58) Field of Classification Search
CPC .............. B01D 2325/42; B01D 63/068; B01D 19/0031; B01D 19/0005; B01D 19/00; B01D 63/06
See application file for complete search history.

(56) References Cited

U.S. PATENT DOCUMENTS 2,736,687 A * 2/1956 Burnside .................. C10G 9/32
208/127
3,150,517 A * 9/1964 Kuffer .................... G01N 30/20
137/625.18
(Continued)

FOREIGN PATENT DOCUMENTS

WO    2014014511 A1    1/2014
WO    2016065132 A1    4/2016

OTHER PUBLICATIONS

PERRY "Perrys-Chemical-Engineers-handbook", pp. 8-40,8-12, 1999, 7th ed., McGraw-Hill (Year: 1999).*

*Primary Examiner* — Anthony R Shumate
(74) *Attorney, Agent, or Firm* — Wagenknecht IP Law Group PC

(57) ABSTRACT

A method and chemical delivery system and device are provided. One method useful in the present invention includes contacting a non-aqueous hydrazine solution with a carrier gas and/or vacuum and delivering a gas stream comprising hydrazine to a critical process or application. One chemical delivery system and device useful in the present invention includes a non-aqueous hydrazine solution having a vapor phase that is in contact with a process carrier gas and/or vacuum. One device useful in the present invention includes a chamber for containing a liquid comprising at least one volatile process chemical, such as a non-aqueous hydrazine solution, a hydrogen peroxide solution, or another suitable process chemical, in fluid communication with a permeable or semi-permeable membrane from which the volatile process chemical can be drawn using a carrier gas and/or vacuum. Another method useful in the present invention involves drawing a process chemical from a device as disclosed herein using a process carrier gas or vacuum and delivering the process chemical to a critical process or application. The system further includes a carrier gas and/or (Continued)

vacuum in fluid contact with the vapor phase and an apparatus for delivering a gas stream comprising at least one component of the solution comprising at least one process chemical to a critical process or application.

28 Claims, 11 Drawing Sheets

(56) References Cited

U.S. PATENT DOCUMENTS

| | | | | |
|---|---|---|---|---|
| 3,206,379 | A * | 9/1965 | Hill | B01D 1/0088 159/13.1 |
| 3,285,055 | A * | 11/1966 | Reinecke | G05D 23/1919 165/290 |
| 4,276,243 | A * | 6/1981 | Partus | B01J 4/008 236/12.12 |
| 4,425,304 | A * | 1/1984 | Kawata | F01N 3/2853 422/171 |
| 4,665,711 | A * | 5/1987 | Page | F24H 4/02 62/238.3 |
| 5,145,362 | A * | 9/1992 | Obermueller | F23G 7/066 110/211 |
| 5,324,286 | A * | 6/1994 | Fowle | A61B 18/02 606/20 |
| 6,021,791 | A * | 2/2000 | Dryer | B01D 19/0031 134/100.1 |
| 6,391,096 | B1 * | 5/2002 | Waters | B01D 19/0031 73/19.02 |
| 6,444,038 | B1 * | 9/2002 | Rangarajan | C23C 16/4481 118/715 |
| 2004/0041286 | A1 * | 3/2004 | Lee | C23C 16/4482 261/121.1 |
| 2004/0202904 | A1 * | 10/2004 | Gore | F17C 11/00 429/421 |
| 2004/0265176 | A1 * | 12/2004 | Kerherve | B01D 19/0005 422/68.1 |
| 2010/0186481 | A1 * | 7/2010 | Schmidt | G01N 30/12 73/23.42 |
| 2013/0089800 | A1 * | 4/2013 | Merth | H01M 8/04231 429/444 |
| 2015/0064593 | A1 * | 3/2015 | Haltiner, Jr. | E21B 41/0085 429/441 |
| 2016/0340187 | A1 * | 11/2016 | Said | B01J 19/2415 |
| 2017/0216738 | A1 * | 8/2017 | Alvarez, Jr. | B01B 1/005 |
| 2017/0312687 | A1 * | 11/2017 | Alvarez, Jr. | B01D 53/8696 |
| 2017/0337995 | B1 * | 11/2017 | Anderson | B01D 53/002 |
| 2017/0369315 | A1 * | 12/2017 | Alvarez, Jr. | C01B 21/16 |
| 2018/0204742 | A1 * | 7/2018 | Tateno | H01L 21/31 |

* cited by examiner

FIGURE 8B

| Test # | CFV Temp (degC) | CFV Exposed Lumen Length (inches) | Length of Test (min) | Rate of Feed Use (mL/hr) | Retentate Concentration (% w/w) | Δ Concentration (% w/w) | Average Peroxide Diffusion Rate (g/hr) |
|---|---|---|---|---|---|---|---|
| 1 | 40 | 7.9375 | 100.8 | 6.03 | 19.97 | 5.13 | 0.39 |
| 2 | 40 | 7.9375 | 67.9 | 4.90 | 19.23 | 5.87 | 0.40 |
| 3 | 40 | 7.9375 | 105.8 | 4.08 | 16.62 | 8.48 | 0.44 |
| 4 | 40 | 7.9375 | 214.6 | 3.56 | 16.88 | 8.22 | 0.27 |
| 5 | 60 | 7.9375 | 130.7 | 3.73 | 10.22 | 14.88 | 0.53 |
| 6 | 60 | 7.9375 | 118.8 | 3.93 | 11.62 | 13.48 | 0.48 |
| 7 | 60 | 7.9375 | 74.8 | 4.16 | 13.58 | 11.52 | 0.46 |
| 8 | 80 | 7.9375 | 353.3 | 1.38 | 4.94 | 20.16 | 0.25 |
| 9 | 80 | 7.9375 | 85.4 | 11.25 | 15.35 | 9.75 | 1.00 |
| 10 | 80 | 7.9375 | 67.0 | 11.29 | 15.47 | 9.63 | 1.07 |
| 11 | 80 | 7.9375 | 52.9 | 2.81 | 7.83 | 17.27 | 0.45 |

*All Tests Run With 1 SLM Carrier Gas

FIGURE 9B

| Test # | CFV Temp (degC) | CFV Exposed Lumen Length (inches) | Length of Test (min) | Carrier Gas Flow (SLM) | Rate of Feed Use (mL/hr) | Retentate Concentration % w/w | Average Peroxide Diffusion Rate (g/hr) | Avg H2O2 Concentration (PPM) |
|---|---|---|---|---|---|---|---|---|
| 1 | 60 | 7.9375 | 43.2 | 1 | 12.11 | 16.94 | 1.03 | 14334 |
| 2 | 60 | 7.9375 | 56.5 | 1 | 11.89 | 17.10 | 1.03 | 14223 |
| 3 | 80 | 7.9375 | 82.1 | 1 | 11.71 | 14.61 | 1.23 | 16416 |
| 4 | 80 | 7.9375 | 165.0 | 1 | 5.77 | 11.94 | 0.73 | 11345 |
| 5 | 80 | 7.9375 | 333.0 | 1 | 1.59 | 6.54 | 0.27 | * |
| 6 | 80 | 14.875 | 360.0 | 1 | 6.05 | 5.98 | 1.21 | 10248 |
| 7 | 80 | 14.875 | 330.0 | 1 | 1.19 | 3.40 | 0.24 | 4297 |
| 8 | 80 | 14.875 | 97.0 | 4 | 17.82 | 10.44 | 2.51 | 9559 |
| 9 | 80 | 14.875 | 88.0 | 2 | 17.15 | 10.21 | 2.64 | 16978 |
| 10 | 80 | 14.875 | 93.0 | 1 | 16.76 | 10.66 | 2.33 | 35872 |
| 11 | 80 | 14.875 | 390.0 | 1 | 1.81 | 3.13 | 0.35 | 5829 |

*=Unable to Calculate Due to Instrument Error

DEVICES, SYSTEMS, AND METHODS FOR CONTROLLED DELIVERY OF PROCESS GASES

CROSS REFERENCE TO RELATED APPLICATIONS

This claims priority to U.S. Provisional Application Ser. No. 62/296,790, filed Feb. 18, 2016, the disclosure of which is hereby expressly incorporated by reference in its entirety and is hereby expressly made a part of this application.

TECHNICAL FIELD

Methods and devices for the vapor phase delivery of high purity process gases, particularly low volatility process gases obtained from a liquid source, in micro-electronics and other critical process applications.

BACKGROUND

Various process gases may be used in the manufacturing and processing of micro-electronics. In addition, a variety of chemicals may be used in other environments demanding high purity gases, e.g., critical processes, including without limitation microelectronics applications, wafer cleaning, wafer bonding, photolithography mask cleaning, atomic layer deposition, chemical vapor deposition, flat panel displays, disinfection of surfaces contaminated with bacteria, viruses and other biological agents, industrial parts cleaning, pharmaceutical manufacturing, production of nano-materials, power generation and control devices, fuel cells, power transmission devices, and other applications in which process control and purity are critical considerations. In those processes, it is necessary to deliver specific amounts of certain process gases under controlled operating conditions, e.g., temperature, pressure, and flow rate.

For a variety of reasons, gas phase delivery of process chemicals is preferred to liquid phase delivery. For applications requiring low mass flow for process chemicals, liquid delivery of process chemicals is not accurate or clean enough. Gaseous delivery would be desired from a standpoint of ease of delivery, accuracy and purity. One approach is to vaporize the process chemical component directly at or near the point of use. Vaporizing liquids provides a process that leaves heavy contaminants behind, thus purifying the process chemical. Gas flow devices are better attuned to precise control than liquid delivery devices. Additionally, micro-electronics applications and other critical processes typically have extensive gas handling systems that make gaseous delivery considerably easier than liquid delivery. However, for safety, handling, stability, and/or purity reasons, many process gases are not amenable to direct vaporization.

There are numerous process gases used in micro-electronics applications and other critical processes. For example, ozone is a gas that is typically used to clean the surface of semiconductors (e.g., photoresist stripping) and as an oxidizing agent (e.g., forming oxide or hydroxide layers). One advantage of using ozone gas in micro-electronics applications and other critical processes, as opposed to prior liquid-based approaches, is that gases are able to access high aspect ratio features on a surface. For example, according to the International Technology Roadmap for Semiconductors (ITRS), current semiconductor processes should be compatible with a half-pitch as small as 14-16 nm. The next technology node for semiconductors is expected to have a half-pitch of 10 nm, and the ITRS calls for <10 nm half-pitch in the near future. At these dimensions, liquid-based chemical processing is not feasible, because the surface tension of the process liquid prevents it from accessing the bottom of deep holes or channels and the corners of high aspect ratio features.

The steps for producing patterned structures on next generation semiconductor devices are requiring lower thermal budgets due to high aspect ratios and heat sensitive materials. To achieve reactions at lower temperatures and to attain full coverage, highly reactive reducing and oxidative liquid chemistries need to be delivered in the vapor phase. Traditional vapor phase delivery methods, e.g., bubblers, are incompatible or ineffective with these new chemistries. For example, bubblers and other analogous devices cannot be heated above about 40° C. with volatile and reactive chemistries, such as hydrogen peroxide or hydrazine containing solutions, which limits the ability to provide higher concentrations of reactive chemistries to critical process applications. In addition, using bubblers and other analogous devices to deliver volatile and reactive chemistries can result in the concentration of the reactive chemicals in the liquid and gas phase of the device increasing during operation of the device. Another shortcoming of many prior devices, systems, and methods is that they cannot safely and/or consistently deliver a high concentration gas stream containing a volatile and reactive chemical, or they cannot sustain the delivery of a high concentration gas stream containing a volatile and reactive chemical over a long period of time, which is often required of in a critical process environment, such as various semiconductor manufacturing processes and other processes. When critical process applications require a higher concentration of a volatile and reactive chemical than can be provided directly from prior devices, systems, and methods, a concentrator or similar device may be used to trap and concentrate the volatile and reactive chemical. But concentrators and similar devices increase the complexity and decrease the efficiency of such devices, systems, and methods, while also presenting safety concerns regarding potential dangerous concentrations of volatile and reactive process gases.

Disclosed herein are devices, systems, and methods for delivering high purity chemicals in the vapor phase to critical processes, e.g., semiconductor, medical, and pharmaceutical applications, that overcome the limitations of prior devices, systems, and methods. The devices, systems, and methods disclosed herein enable consistent delivery of volatile and reactive process gases, such as hydrogen peroxide or hydrazine, over a wide range of concentrations, including relatively high concentrations that would not be possible or safe with prior devices, systems, and methods.

SUMMARY OF CERTAIN EMBODIMENTS

Methods, systems, and devices for delivering high purity chemicals in the vapor phase to critical processes are provided. The methods, systems, and devices are particularly useful in micro-electronics applications and other critical processes.

Generally, the methods comprise (a) providing a liquid source separated from a vapor phase comprising at least one component of the liquid source, wherein the liquid source flows through a housing comprising a heater device; (b) controlling the relative concentration of the liquid phase components in the vapor phase by adjusting the temperature of the heater device in thermal contact with the liquid source; (c) contacting a carrier gas or vacuum with the vapor phase; and (d) delivering a gas stream comprising at least one component of the liquid source to a critical process.

By adjusting the operating conditions of the methods—e.g., the temperature and pressure of the carrier gas or vacuum; the temperature, pressure, flow rate, or concentration of the liquid source; and the temperature of the heater device—a component of the liquid source can be precisely and safely delivered as a process gas. The methods disclosed herein are capable of consistently and safely providing a wide range of concentrations of process gas, including relatively high concentrations of process gas, in the process gas stream, e.g., about 1000 ppm or greater, about 2000 ppm or greater, about 3000 ppm or greater, about 4000 ppm or greater, about 5000 ppm or greater, about 6000 ppm or greater, about 7000 ppm or greater, about 8000 ppm or greater, about 9000 ppm or greater, about 10,000 ppm or greater, about 12,000 ppm or greater, about 15,000 ppm or greater, about 18,000 ppm or greater, about 20,000 ppm or greater, about 30,000 ppm or greater, about 40,000 ppm or greater, or about 50,000 ppm or greater. The methods disclosed herein are capable of consistently and safely delivering process gas over a wide range of liquid source solution temperatures, including relatively high temperatures for the applicable process gases, e.g., about 40° C. or greater, about 45° C. or greater, about 50° C. or greater, about 55° C. or greater, about 60° C. or greater, about 65° C. or greater, about 70° C. or greater, about 75° C. or greater, about 80° C. or greater, about 85° C. or greater, about 90° C. or greater, about 95° C. or greater, about 100° C. or greater, about 110° C. or greater, or about 120° C. or greater. In certain embodiment, the methods disclosed herein include delivering process gas at approximately the same temperature as that of the liquid source solution. In certain embodiments, the methods disclosed herein include delivering process gas at temperature that is lower or higher than the temperature of the liquid solution. In certain embodiments, the methods disclosed herein further comprise cooling the process gas stream before delivering the gas stream to a critical process application, which can have the effect of concentrating the process gas containing carrier gas stream relative to a maximum saturation level of the process gas.

In certain embodiments of the methods disclosed herein, the liquid source comprises a single component. In certain embodiments, the liquid source comprises a multi-component solution comprising the liquid phase of a process gas, e.g., hydrazine or hydrogen peroxide, and a suitable solvent, e.g., a water or a non-aqueous solution, such as an organic solvent. In certain embodiments, the liquid source comprises hydrazine or hydrogen peroxide in a non-aqueous solution, such as an organic solvent.

In certain embodiments, the methods disclosed herein further comprise continuously flowing the liquid source through the housing.

In certain embodiments of the methods disclosed herein, the housing further comprises a selectively permeable membrane, e.g., a substantially gas-impermeable membrane, separating the liquid source from a vapor phase in the housing through which the carrier gas flows. In certain embodiments, the liquid source flows through the membrane, e.g., by using one or more tubular membranes, or lumens, connected to the first inlet port and the first outlet port. In certain embodiments, the carrier gas flows through the membrane, e.g., by using one or more tubular membranes, or lumens, connected to the second inlet port and the second outlet port. In certain embodiments, the housing comprises multiple lumens through which either the liquid source or the carrier gas flows. In certain embodiments, the housing comprises a head space through which the carrier gas glows. In certain embodiments, the carrier gas flows through one or more membranes that terminate in a head space of the housing.

In certain embodiments of the methods disclosed herein, the heater device is located inside the housing and in direct thermal contact with the liquid source. In certain embodiments, it is advantageous to heat the liquid source solution without directly heating the housing, e.g., to avoid heating the housing and/or process gas containing gas stream to unsafe temperatures.

The devices disclosed herein generally comprise (a) a housing comprising a heater device in thermal contact with a liquid source, (b) a first inlet port of the housing configured to allow the liquid source to flow into the housing, (c) a first outlet port of the housing configured to allow the liquid source to flow out of the housing, (d) a device for controlling the temperature of the heater device, (e) a second inlet port of the housing configured to allow a carrier gas to flow into the housing, and (f) a second outlet port of the housing configured to allow a carrier gas comprising at least one component of the liquid source in the vapor phase to flow out of the housing.

By adjusting the operating conditions of the devices disclosed herein—e.g., the temperature and pressure of the carrier gas or vacuum; the temperature, pressure, flow rate, or concentration of the liquid source; and the temperature of the heater device—a component of the liquid source can be precisely and safely delivered as a process gas. The devices disclosed herein consistently and safely provide a wide range of concentrations of process gas, including relatively high concentrations of process gas, in the process gas stream, e.g., about 1000 ppm or greater, about 2000 ppm or greater, about 3000 ppm or greater, about 4000 ppm or greater, about 5000 ppm or greater, about 6000 ppm or greater, about 7000 ppm or greater, about 8000 ppm or greater, about 9000 ppm or greater, about 10,000 ppm or greater, about 12,000 ppm or greater, about 15,000 ppm or greater, about 18,000 ppm or greater, about 20,000 ppm or greater, about 30,000 ppm or greater, about 40,000 ppm or greater, or about 50,000 ppm or greater. The devices disclosed herein consistently and safely deliver process gas over a wide range of liquid source solution temperatures, including relatively high temperatures for the applicable process gases, e.g., about 40° C. or greater, about 45° C. or greater, about 50° C. or greater, about 55° C. or greater, about 60° C. or greater, about 65° C. or greater, about 70° C. or greater, about 75° C. or greater, about 80° C. or greater, about 85° C. or greater, about 90° C. or greater, about 95° C. or greater, about 100° C. or greater, about 110° C. or greater, or about 120° C. or greater. In certain embodiments, the devices disclosed herein deliver process gas at approximately the same temperature as that of the liquid source solution. In certain embodiments, the devices disclosed herein deliver process gas at temperature that is lower or higher than the temperature of the liquid solution. In certain embodiments, the devices disclosed herein further comprise a device for cooling the process gas stream before delivering the gas stream to a critical process application, which can have the effect of concentrating the process gas containing carrier gas stream relative to a maximum saturation level of the process gas.

In certain embodiments of the devices disclosed herein, the liquid source comprises a single component. In certain embodiments, the liquid source comprises a multi-component solution comprising the liquid phase of a process gas, e.g., hydrazine or hydrogen peroxide, and a suitable solvent, e.g., a water or a non-aqueous solution, such as an organic solvent. In certain embodiments, the liquid phase comprises hydrazine or hydrogen peroxide in a non-aqueous solution, such as an organic solvent.

In certain embodiments, the devices disclosed herein are configured to provide continuous flow of the liquid source during operation of the devices.

In certain embodiments of the devices disclosed herein, the housing further comprises a selectively permeable membrane separating the liquid source from a vapor phase in the housing through which the carrier gas flows. In certain embodiments, the device is configured to enable the liquid source to flow through the membrane, e.g., by using one or more tubular membranes, or lumens, connected to the first inlet port and the first outlet port. In certain embodiments, the device is configured to enable the carrier gas to flow through the membrane, e.g., by using one or more tubular membranes connected to the second inlet port and the second outlet port. In certain embodiments, the one or more membranes, lumens, or other conduit through which the carrier gas flows terminates in the head space of the device and the second outlet port is not connected to the membrane or other conduit.

In certain embodiments, the heater device may be an electrical heater compatible with the chemicals contained in the liquid source, e.g., a heater block or a heater coil that may or may not be coated with a liquid source compatible coating, e.g., polytetrafluoroethylene (such as TEFLON® (E.I. du Pont de Nemours & Company)). In certain embodiments, the temperature of the process gas delivery may be controlled by a hot or cold fluid flowing through conduit in thermal contact with the device, e.g., a heated oil flowing through a metal coil inside the housing or a heated oil flowing through fluid conduits in the exterior walls of the housing. In certain embodiments of the devices disclosed herein, the heater device is located inside the housing and in direct thermal contact with the liquid source. In certain embodiments, it is advantageous to heat the liquid source solution without directly heating the housing, e.g., to avoid heating the housing and/or process gas containing gas stream to unsafe temperatures.

Also disclosed herein are systems that comprise the devices disclosed herein. Generally, the systems disclosed herein comprise a process gas delivery device of the type disclosed herein, a critical process to which the process gas is delivered, devices for delivering the liquid source comprising the process gas chemicals in the liquid phase to the process gas delivery device, and gas and liquid handling devices and systems. In certain embodiments, the systems include a device that comprises (a) a housing comprising a heater device in thermal contact with a liquid source, (b) a first inlet port of the housing configured to allow the liquid source to flow into the housing, (c) a first outlet port of the housing configured to allow the liquid source to flow out of the housing, (d) a device for controlling the temperature of the heater device, (e) a second inlet port of the housing configured to allow a carrier gas to flow into the housing, and (f) a second outlet port of the housing configured to allow a carrier gas comprising at least one component of the liquid source in the vapor phase to flow out of the housing.

By adjusting the operating conditions of the systems disclosed herein—e.g., the temperature and pressure of the carrier gas or vacuum; the temperature, pressure, flow rate, or concentration of the liquid source; and the temperature of the heater device—a component of the liquid source can be precisely and safely delivered as a process gas. The systems disclosed herein consistently and safely involve providing a wide range of concentrations of process gas to a critical process application, including relatively high concentrations of process gas, in the process gas stream, e.g., about 1000 ppm or greater, about 2000 ppm or greater, about 3000 ppm or greater, about 4000 ppm or greater, about 5000 ppm or greater, about 6000 ppm or greater, about 7000 ppm or greater, about 8000 ppm or greater, about 9000 ppm or greater, about 10,000 ppm or greater, about 12,000 ppm or greater, about 15,000 ppm or greater, about 18,000 ppm or greater, about 20,000 ppm or greater, about 30,000 ppm or greater, about 40,000 ppm or greater, or about 50,000 ppm or greater. The systems disclosed herein consistently and safely deliver process gas to a critical process application over a wide range of liquid source solution and/or process gas stream temperatures, including relatively high temperatures for the applicable process gases, e.g., about 40° C. or greater, about 45° C. or greater, about 50° C. or greater, about 55° C. or greater, about 60° C. or greater, about 65° C. or greater, about 70° C. or greater, about 75° C. or greater, about 80° C. or greater, about 85° C. or greater, about 90° C. or greater, about 95° C. or greater, about 100° C. or greater, about 110° C. or greater, or about 120° C. or greater. In certain embodiments, the systems disclosed herein deliver process gas at approximately the same temperature as that of the liquid source solution. In certain embodiments, the systems disclosed herein deliver process gas at a temperature that is lower or higher than the temperature of the liquid solution. In certain embodiments, the systems disclosed herein further comprise a device for cooling the process gas stream before delivering the gas stream to the critical process application, which can have the effect of concentrating the process gas containing carrier gas stream relative to a maximum saturation level of the process gas. In certain embodiments of the systems disclosed herein, the process gas delivery device comprising the system further comprises a selectively permeable membrane separating the liquid source from a vapor phase in the housing through which the carrier gas flows. In certain embodiments, the process gas delivery device is configured to enable the liquid source to flow through the membrane, e.g., by using a tubular membrane connected to the first inlet port and the first outlet port. In certain embodiments, the process gas delivery device is configured to enable the carrier gas to flow through the membrane, e.g., by using a tubular membrane connected to the second inlet port and the second outlet port. In certain embodiments, the membrane or other conduit through which the carrier gas flows terminates in the head space of the device and the second outlet port is not connected to the membrane or other conduit.

In certain embodiments of the systems disclosed herein, the liquid source comprises a single component. In certain embodiments, the liquid source comprises a multi-component solution comprising the liquid phase of a process gas, e.g., hydrazine or hydrogen peroxide, and a suitable solvent, e.g., a water or a non-aqueous solution, such as an organic solvent. In certain embodiments, the liquid phase comprises hydrazine or hydrogen peroxide in a non-aqueous solution, such as an organic solvent.

In certain embodiments of the systems disclosed herein, the process gas delivery devices are configured to provide continuous flow of the liquid source during operation of the devices.

In certain embodiments of the systems disclosed herein, the critical process is a semiconductor manufacturing process, e.g., an atomic layer deposition (ALD) process, an etching or cleaning process (such as an atomic layer etching (ALE) process), an oxidation process, a chemical vapor deposition (CVD) process, a metal organic CVD (MOCVD) process, or epitaxial growth process. In certain embodiments, the system comprises an ALD chamber and the critical process to which the process gas is delivered is an ALD process. In certain embodiments the critical process is a process for making semiconductors, light emitting diodes (LEDs), organic LEDs, liquid crystal displays (LCDs) or other types of displays, solar cells, catalytic coatings, high power devices, optical detectors, or barrier layer films.

In certain embodiments of the systems disclosed herein, the devices for delivering the liquid source comprise (a) one or more storage tanks for containing the liquid source that are compatible with its constituent chemicals; (b) liquid handling equipment configured to deliver the liquid source to the gas process delivery device, which liquid handling equipment is compatible with the liquid source and constituent chemicals; and (c) one or more storage tanks for containing the liquid source waste stream that exits the process gas delivery device. In certain embodiments, the devices for delivering the liquid source further comprise point of use purifiers, pumps, valves, flow controllers, and gas handling systems that are typically found in critical process applications, e.g., semiconductor manufacturing. In certain embodiments, the devices for delivering the liquid source are contained in a unitary housing with associated inlet and outlet ports for the liquid source to be delivered to the process gas delivery device, the liquid source waste stream, and any associated gas handling systems, e.g., inert gases or clean dry air that may be used to maintain pressure inside the storage tanks.

The devices, systems, and methods provided herein may further comprise removing one or more components from the carrier gas stream comprising one or more process gases to produce a purified gas stream, e.g., using a device that selectively or non-selectively removes components from the gas stream. Preferred devices would be devices that substantially remove a non-reactive process gas from the gas stream, while the amount of desired reactive components (e.g., hydrazine or hydrogen peroxide) in the gas stream is relatively unaffected. For example, a device may remove any solvents or stabilizers from the gas stream, including without limitation any traces of water or non-aqueous solvents. For example, the devices may further comprise a purifier positioned downstream of the head space. Particularly preferred purifier devices are membrane contactors, molecular sieves, activated charcoal, and other adsorbents, if they have the desired characteristics to meet the application or process requirements. A preferred characteristic of the gas removal device is the ability to remove certain component(s) in a relatively selective manner while allowing the remaining component(s) to remain in the gas stream relatively unaffected.

The devices provided herein may further comprise various components for containing and controlling the flow of the gases and liquids used therein. For example, the devices may further comprise mass flow controllers, valves, check valves, pressure gauges, regulators, rotameters, and pumps. The devices provided herein may further comprise various heaters, thermocouples, and temperature controllers to control the temperature of various components of the devices and steps of the methods.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the embodiments and claims.

It is to be understood that both the foregoing general description and the following detailed description are exemplary and explanatory only and are not restrictive of the invention.

The accompanying drawings, which are incorporated in and constitute a part of this specification, illustrate several embodiments of the invention and, together with the description, serve to explain the principles of the embodiments disclosed herein.

FIGURES

FIG. 8B is a table of results from employing the methods, systems, and devices disclosed herein in embodiments for delivering hydrogen peroxide.

FIG. 9B is a table of results from employing the methods, systems, and devices disclosed herein in embodiments for delivering hydrogen peroxide.

DETAILED DESCRIPTION OF CERTAIN EMBODIMENTS

Figure 1:
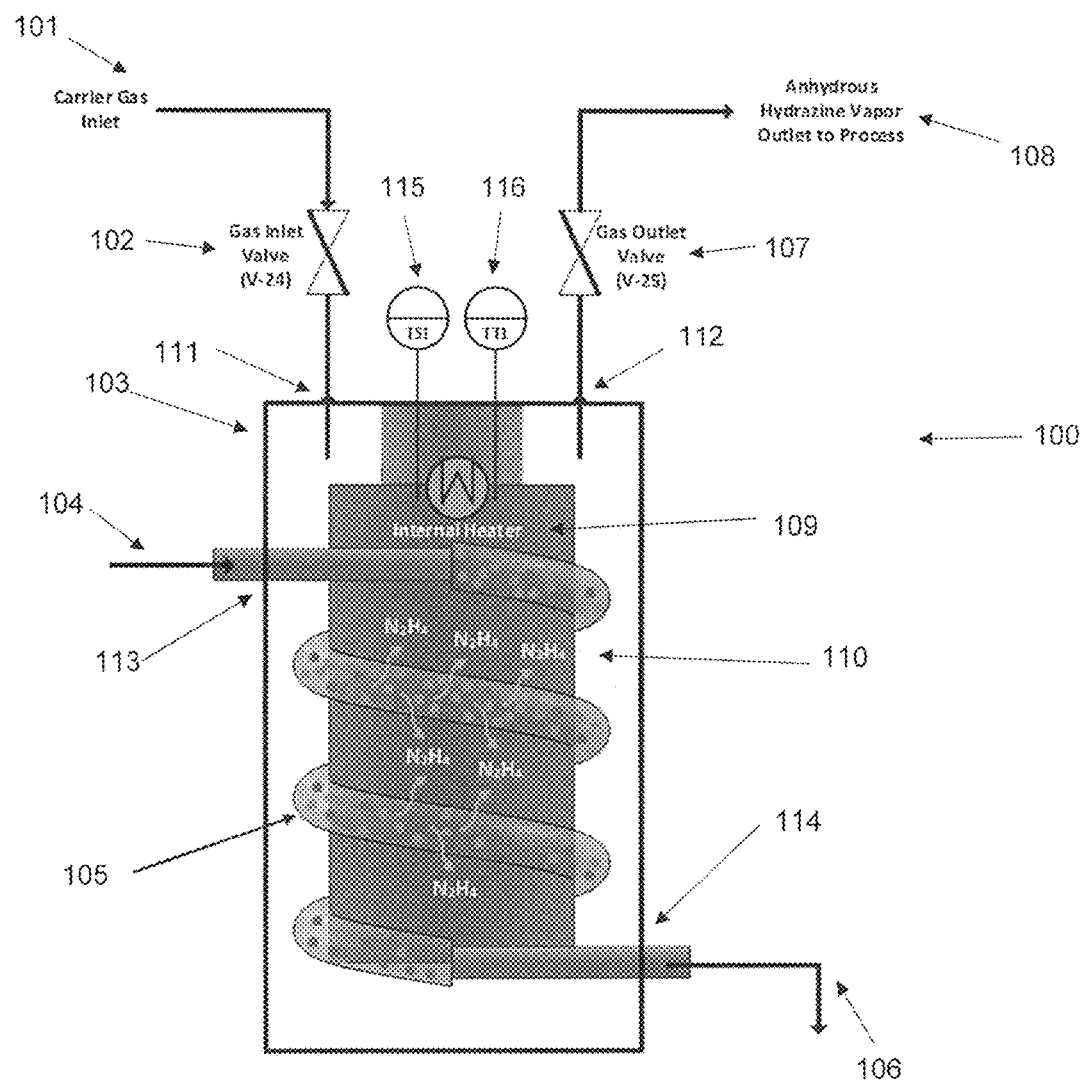
FIG. 1 is a diagram illustrating certain embodiments of the devices, systems, and methods disclosed herein for delivering hydrazine in the vapor phase.

The term "process gas" as used herein is a broad term, and is to be given its ordinary and customary meaning to a person of ordinary skill in the art (and is not to be limited to a special or customized meaning), and refers without limitation to a gas that is used in an application or process, e.g., a step in the manufacturing or processing of micro-electronics and in other critical processes. Exemplary process gases are inorganic acids, organic acids, inorganic bases, organic bases, and inorganic and organic solvents. Preferred process gases useful in the devices, systems, and methods disclosed herein are hydrazine and hydrogen peroxide.

The term "reactive process gas" as used herein is a broad term, and is to be given its ordinary and customary meaning to a person of ordinary skill in the art (and is not to be limited to a special or customized meaning), and refers without limitation to a process gas that chemically reacts in the particular application or process in which the gas is employed, e.g., by reacting with a surface, a liquid process chemical, or another process gas. Exemplary reactive process gases useful in the devices, systems, and methods disclosed herein are hydrazine and hydrogen peroxide.

The term "non-reactive process gas" as used herein is a broad term, and is to be given its ordinary and customary meaning to a person of ordinary skill in the art (and is not to be limited to a special or customized meaning), and refers without limitation to a process gas that does not chemically react in the particular application or process in which the gas is employed, but the properties of the "non-reactive process gas" provide it with utility in the particular application or process.

The term "carrier gas" as used herein is a broad term, and is to be given its ordinary and customary meaning to a person of ordinary skill in the art (and is not to be limited to a special or customized meaning), and refers without limitation to a gas that is used to carry another gas through a process train, which is typically a train of piping. Exemplary carrier gases are nitrogen, argon, hydrogen, oxygen, CO2, clean dry air, helium, or other gases that are stable at room temperature and atmospheric pressure.

The term "liquid source" or "liquid source solution" as used herein is a broad term, and is to be given its ordinary and customary meaning to a person of ordinary skill in the art (and is not to be limited to a special or customized meaning), and refers without limitation to a liquid phase solution comprising a process gas, such as a reactive process gas or a non-reactive process gas, present in the liquid phase in, or as a dissolved gas in, a solvent, wherein the liquid phase solution is used as the source of process gas in a device, system, or method for delivering the process gas to a critical process application. Exemplary liquid sources useful in the devices, systems, and methods disclosed herein comprise hydrazine or hydrogen peroxide in a non-aqueous solution, such as an organic solvent.

The term "process gas delivery device" as used herein is a broad term, and is to be given its ordinary and customary meaning to a person of ordinary skill in the art (and is not to be limited to a special or customized meaning), and refers without limitation to devices for delivering process gases to critical process applications. Generally, the devices disclosed herein belong the broad class of process gas delivery devices, wherein the process gas delivery devices disclosed herein have the unique and surprising ability to consistently and safely provide process gas containing gas streams having relatively high concentrations of process gas. The term process gas delivery device, as used herein, does not mean a nebulizer, pervaporator, or similar device.

The term "critical process" or "critical process application" as used herein is a broad term, and is to be given its ordinary and customary meaning to a person of ordinary skill in the art (and is not to be limited to a special or customized meaning), and refers without limitation to applications that could benefit from techniques which allowed for the use of gaseous process chemicals obtained from a multi-component liquid source. Exemplary critical processes and critical process applications include decontamination applications or applications directed to microelectronics and semiconductors, including without limitation atomic layer deposition (ALD); atomic layer etch (ALE); wafer: bonding, cleaning, annealing, stripping, thermal oxidation, chemical oxidation, chemical vapor deposition, sputtering, molecular beam epitaxy (MBE), and surface passivation; decontamination: of materials such as medical instruments, genetic sequencing equipment, food preparation surfaces, food surfaces, and surfaces in hospital rooms, public spaces and transportation vehicles by killing or reducing the number of DNA, bacteria, viruses, spores, mold, and/or pyrogens from materials; annealing of amorphous oxides for displays and TFTs; industrial application such as plasma oxidation of surfaces for painting and hydrophobic conversion, chemical vapor deposition (CVD), sputtering, oxidation, and passivation.

The term "head space" as used herein is a broad term, and is to be given its ordinary and customary meaning to a person of ordinary skill in the art (and is not to be limited to a special or customized meaning), and refers without limitation to a volume of gas in fluid contact with a liquid source solution that provides at least a portion of the gas contained in the head space. There may be a permeable or selectively permeable barrier separating the head space that is, optionally, in direct contact with the liquid source solution. In those embodiments where the membrane is not in direct contact with the liquid source solution, more than one head space may exist, i.e. a first head space directly above the solution that contains the vapor phase of the solution and a second head space separated from the first head space by a membrane that only contains the components of the first space that can permeate the membrane, e.g., hydrogen peroxide or hydrazine. In those embodiments with a hydrogen peroxide solution and a head space separated by a substantially gas-impermeable membrane, the head space may be located above, below, or on any side of the hydrogen peroxide solution, or the head space may surround or be surrounded by the hydrogen peroxide solution. For example, the head space may be the space inside a substantially gas-impermeable tube running through the hydrogen peroxide solution or the hydrogen peroxide solution may be located inside a substantially gas-impermeable tube with the head space surrounding the outside of the tube.

The term "substantially gas-impermeable membrane" as used herein is a broad term, and is to be given its ordinary and customary meaning to a person of ordinary skill in the art (and is not to be limited to a special or customized meaning), and refers without limitation to a membrane that is relatively permeable to other components that may be present in a gaseous or liquid phase, e.g., hydrogen peroxide, but relatively impermeable to other gases such as, but not limited to, hydrogen, nitrogen, oxygen, carbon monoxide, carbon dioxide, hydrogen sulfide, hydrocarbons (e.g., ethylene), volatile acids and bases, refractory compounds, and volatile organic compounds.

The term "ion exchange membrane" as used herein is a broad term, and is to be given its ordinary and customary meaning to a person of ordinary skill in the art (and is not to be limited to a special or customized meaning), and refers without limitation to a membrane comprising chemical groups capable of combining with ions or exchanging with ions between the membrane and an external substance. Such chemical groups include, but are not limited to, sulfonic acid, carboxylic acid, sulfonamide, sulfonyl imide, phosphoric acid, phosphinic acid, arsenic groups, selenic groups, phenol groups, and salts thereof.

The term "non-aqueous solution" as used herein is a broad term, and is to be given its ordinary and customary meaning to a person of ordinary skill in the art (and is not to be limited to a special or customized meaning), and refers to a solution comprising two or more components containing less than 10 weight (wt.) % water.

The term "solvent" as used herein is a broad term, and is to be given its ordinary and customary meaning to a person of ordinary skill in the art (and is not to be limited to a special or customized meaning), and refers to any compound that produces a liquid when mixed with a solute, such as hydrazine or hydrogen peroxide, in the applicable ratio under the applicable operating conditions.

In certain embodiments, the devices, systems, and methods disclosed herein comprise a substantially gas-impermeable ionic exchange membrane. Gas impermeability can be determined by the "leak rate." The term "leak rate" as used herein is a broad term, and is to be given its ordinary and customary meaning to a person of ordinary skill in the art (and is not to be limited to a specialized or customized meaning), and refers without limitation to the volume of a particular gas that penetrates the membrane surface area per unit of time. For example, a substantially gas-impermeable membrane could have a low leak rate of gases (e.g., a carrier gas) other than a process gas (e.g., hydrazine and hydrogen peroxide), such as a leak rate of less than about 0.001 cm3/cm2/s under standard atmospheric temperature and pressure. Alternatively, a substantially gas-impermeable membrane can be identified by a ratio of the permeability of a process gas vapor compared to the permeability of other gases. Preferably, the substantially gas-impermeable membrane is more permeable to such process gases than to other gases by a ratio of at least 10,000:1, such as a ratio of at least about 20,000:1, 30,000:1, 40,000:1, 50,000:1, 60,000:1, 70,000:1, 80,000:1, 90,000:1 or a ratio of at least 100,000:1, 200,000:1, 300,000:1, 400,000:1, 500,000:1, 600,000:1, 700,000:1, 800,000:1, 900,000:1 or even a ratio of at least about 1,000,000:1. However, in other embodiments, other ratios that are less than 10,000:1 can be acceptable, for example 1.5:1, 2:1, 3:1, 4:1, 5:1, 6:1, 7:1, 8:1, 9:1, 10:1; 50:1, 100:1, 500:1, 1,000:1, or 5,000:1 or more.

In certain embodiments, the membrane is an ion exchange membrane, such as a polymer resin containing exchangeable ions. Preferably, the ion exchange membrane is a fluorine-containing polymer, e.g., polyvinylidenefluoride, polytetrafluoroethylene (PTFE), ethylene tetrafluoride-propylene hexafluoride copolymers (FEP), ethylene tetrafluoride-perfluoroalkoxyethylene copolymers (PFE), polychlorotrifluoroethylene (PCTFE), ethylene tetrafluorideethylene copolymers (ETFE), polyvinylidene fluoride, polyvinyl fluoride, vinylidene fluoride-trifluorinated ethylene chloride copolymers, vinylidene fluoride-propylene hexafluoride copolymers, vinylidene fluoridepropylene hexafluoride-ethylene tetrafluoride terpolymers, ethylene tetrafluoride-propylene rubber, and fluorinated thermoplastic elastomers. Alternatively, the resin comprises a composite or a mixture of polymers, or a mixture of polymers and other components, to provide a contiguous membrane material. In certain embodiments, the membrane material can comprise two or more layers. The different layers can have the same or different properties, e.g., chemical composition, porosity, permeability, thickness, and the like. In certain embodiments, it can also be desirable to employ a layer (e.g., a membrane) that provides support to the filtration membrane, or possesses some other desirable property.

The ion exchange membrane is preferably a perfluorinated ionomer comprising a copolymer of ethylene and a vinyl monomer containing an acid group or salts thereof. Exemplary perfluorinated ionomers include, but are not limited to, perfluorosulfonic acid/tetrafluoroethylene copolymers ("PFSA-TFE copolymer") and perfluorocarboxylic acid/tetrafluoroethylene copolymer ("PFCA-TFE copolymer"). These membranes are commercially available under the tradenames NAFION® (E.I. du Pont de Nemours & Company), 3M Ionomer (Minnesota Mining and Manufacturing Co.), FLEMION® (Asahi Glass Company, Ltd.), ACIPLEX® (Asahi Chemical Industry Company), and AQUIVON® (Solvay S.A.).

In preparing a process gas containing gas stream, a process gas solution (e.g., a hydrazine or hydrogen peroxide solution) can be passed through the membrane. The term "passing a process gas solution through a membrane" as used herein is a broad term, and is to be given its ordinary and customary meaning to a person of ordinary skill in the art (and is not to be limited to a special or customized meaning), and refers without limitation to contacting a first side of a membrane with the process gas containing solution (e.g., a liquid source comprising a process gas in its liquid phase), such that the process gas passes through the membrane, and obtaining a process gas containing gas stream on the opposite side of the membrane. The first and second sides can have the form of substantially flat, opposing planar areas, where the membrane is a sheet. Membranes can also be provided in tubular or cylindrical form where one surface forms the inner position of the tube and an opposing surface lies on the outer surface. The membrane can take any form, so long as the first surface and an opposing second surface sandwich a bulk of the membrane material. Depending on the processing conditions, nature of the process gas solution, volume of the liquid solution's vapor to be generated, and other factors, the properties of the membrane can be adjusted. Properties include, but are not limited to physical form (e.g., thickness, surface area, shape, length and width for sheet form, diameter if in fiber form), configuration (flat sheet(s), spiral or rolled sheet(s), folded or crimped sheet(s), fiber array(s)), fabrication method (e.g., extrusion, casting from solution), presence or absence of a support layer, presence or absence of an active layer (e.g., a porous prefilter to adsorb particles of a particular size, a reactive prefilter to remove impurities via chemical reaction or bonding), and the like. It is generally preferred that the membrane be from about 0.5 microns in thickness or less to 2000 microns in thickness or more, preferably from about 1, 5, 10, 25, 50, 100, 200, 300, 400, or 500 microns to about 600, 700, 800, 900, 1000, 1100, 1200, 1300, 1400, 1500, 1600, 1700, 1800, or 1900 microns. When thinner membranes are employed, it can be desirable to provide mechanical support to the membrane (e.g., by employing a supporting membrane, a screen or mesh, or other supporting structure), whereas thicker membranes may be suitable for use without a support. The surface area can be selected based on the mass of vapor to be produced.

The methods, systems, and devices described herein are generally applicable to a wide variety of process gas streams derived from process gas containing liquid source solutions. Particularly relevant liquid source solutions are non-aqueous hydrazine solutions and non-aqueous hydrogen peroxide solutions. Aqueous process gas containing liquid source solutions, e.g., aqueous hydrazine solution and aqueous hydrogen peroxide solutions, are also applicable to the devices, systems, and methods disclosed herein. In some embodiments, additional components of the process gas containing liquid source solution include stabilizers and other adjuvants.

In certain embodiments, the liquid source solution comprises substantially pure hydrazine, meaning hydrazine in which no other chemicals are deliberately included but allowing for incidental amounts of impurities. In certain embodiments, the solution comprises from about 5% to about 99% by weight of hydrazine, or from about 90% to about 99%, from about 95% to about 99%, from about 96% to about 99%, from about 97% to about 99%, from about 98% to about 99%, or from about 99% to about 100% by weight of hydrazine, with the remaining components comprising solvents and/or stabilizers. In some embodiments, the solution comprises hydrazine at concentrations greater than 99.9% purity and, in some embodiments, the solution comprises hydrazine at concentrations of greater than 99.99%. Selection of an appropriate non-aqueous hydrazine solution will be determined by the requirements of a particular application or process.

In certain embodiments, the liquid source solution is a non-aqueous hydrazine solution that comprises, in addition to hydrazine, one or more suitable solvents. Exemplary liquid source solutions comprising hydrazine are disclosed in PCT Publication No. WO2016065132, which is incorporated by reference herein in its entirety, particularly to paragraphs [013] and [014] and in Examples 1, 2, and 3.

In certain embodiments, the liquid source solution is a non-aqueous hydrogen peroxide solution that comprises, in addition to hydrogen peroxide, one or more suitable solvents. Exemplary liquid source solutions comprising hydrogen peroxide are disclosed in PCT Publication No. WO2014014511, which is incorporated by reference herein in its entirety, particularly in paragraphs [009] to [012] and Examples 1 and 2.

Exemplary non-aqueous solutions are solutions containing alcohols, including polyalcohols, phenols, lactones, amides, esters, including polyesters, ethers, carboxylic acids, including polycarboxylic acids, sulfonic acids, sulfinic acids, phosphonic acids, phosphinic acids, organic solvents, inorganic solvents, aromatic compounds, polyaromatic compounds, heterocyclic compounds, including polyheterocyclic compounds, fluorinated ethers, fluorinated alcohols, fluorinated sulfonic acids, fluorinated carboxylic acids, including polycarboxylic acids, fluorinated phosphonic acids, deep eutectic solvents, such as those disclosed in U.S. Pat. No. 3,557,009 and herein incorporated by reference, and combinations thereof that do not contain substantial amounts of water. Exemplary solvents include diethyl phthalate, propylene carbonate, triethylphosphate, polyvinylpyrroidone, polyvinylalcohol, polyvinylacetate-polyvinylpyrrolidone co-polymer, mellitic acid, benzenehexol, tetrahydobenzoquinone, 1,8-octanediol, 2,6-dichlorophenol, acridine, 8-hydroxyquinoline, benzylic acid, 1,4-dioxane, amyl acetate, DMF, DMSO, dimethylacetamide, 2-ethyl-1-hexanol, furfuryl alcohol, 2-octanol, 2-methyl-2-heptanol, and combinations thereof.

Hydrogen peroxide containing liquid source solutions may optionally comprise inorganic and/or organic stabilizers, which may include, but are not limited to, sodium stannate, phosphoric acid, pyrophosphates, phosphonates, phosphites, and combinations thereof. In a preferred embodiment, the stabilizer does not permeate the membrane. In another embodiment, the stabilizer is removed from the process gas prior to the delivery to a critical process or application. In some embodiments, a compound may serve a dual purpose as a solvent and stabilizer, particularly when the compound is acidic.

In certain embodiments, the solution comprises from about 5% to about 99% hydrogen peroxide, with the remaining components comprising solvents and/or stabilizers. In a preferred embodiment, the hydrogen peroxide solution comprises a diethyl phthalate-hydrogen peroxide solution, particularly a 15-30 wt. % hydrogen peroxide solution. In another preferred embodiment, the hydrogen peroxide solution comprises a propylene carbonate-hydrogen peroxide solution, particularly a 30 wt. % hydrogen peroxide solution. Selection of an appropriate non-aqueous hydrogen peroxide solution will be determined by the requirements of a particular application or process.

FIG. 1 illustrates certain embodiments of the devices, systems, and methods disclosed herein. As shown in FIG. 1, a liquid source solution 104 comprising 68 wt. % hydrazine in an organic solvent is introduced into process gas delivery device 100 having a liquid source inlet port 113 for receiving a liquid source. Exemplary liquid source solutions comprising hydrazine are disclosed in PCT Publication No. WO2016065132, which is incorporated by reference herein in its entirety, particularly in paragraphs [013] and [014] and in Examples 1, 2, and 3. Exemplary liquid source solutions comprising hydrogen peroxide are disclosed in PCT Publication No. WO2014014511, which is incorporated by reference herein in its entirety, particularly in paragraphs [009] to [012] and Examples 1 and 2. The liquid source solution flows through a tubular selectively permeable membrane 105, e.g., a substantially gas-impermeable membrane, such as the NAFION® membrane shown in FIG. 1, and is heated by an internal heater device 109. The tubular membrane 105 can be a single lumen or multi-lumen assembly fashioned into a helical coil, loop, straight path, or braided assembly. The volatile component, e.g., hydrazine (i.e., $N_2H_4$), passes through the membrane and is vaporized into the head space 110 of the device 100, delineated by the housing 103. In this example, the construction of the tubular membrane 105 maximizes the surface area for vaporization and improves the process gas delivery rate compared to traditional bubblers or other prior process gas delivery devices. The hydrazine in the head space 110 of the device 100 is carried away by the flow of carrier gas 101 through the head space 110. The carrier gas 101 enters the housing 103 at carrier gas inlet port 111 via valve 102 (V-24), travels through the head space 110 where it combines with process gas (e.g., hydrazine) vapor, and the process gas-containing carrier gas 108 exits the housing 103 through gas outlet port 112 via valve 107 (V-25) to be delivered as anhydrous hydrazine process gas to a critical process application.

As shown in FIG. 1, the removal of process gas (e.g., hydrazine) from liquid source 104 by evaporation into head space 110 across membrane 105 results in a liquid source waste stream 106 that has an entirely or substantially diminished concentration of process gas (e.g., hydrazine), e.g., less than 10 wt. %. The liquid source waste stream 106 exits housing 103 through liquid source outlet port 114 to be carried to a suitable waste receptacle. By operating the device shown in FIG. 1 over a period of time, it was shown that the inlet and outlet concentrations of hydrazine in the liquid source were relatively constant and dependent on the process conditions, e.g., temperature, liquid source flow rate, pressure, carrier gas flow rate, and membrane layout. Although the concentration decreases along the liquid source flow path from the inlet of the housing to the outlet of the housing, the concentration gradient surprisingly reaches a state of equilibrium. Thus, the devices, systems, and methods disclosed herein are capable of process gas delivery, such as hydrazine or hydrogen peroxide, at a relatively constant mass flow rate regardless of the time of operation, i.e., the relative concentration of the volatile process gas in the vapor phase does not change over time because, unlike a traditional bubbler or similar devices, the relative concentration of the volatile process gas in the liquid source does not diminish over time.

In the example shown in FIG. 1, the temperature of the internal heater 109 is controlled by a feedback-PID controller in conjunction with a temperature transducer 115 (TT1) located next to the heater element 117. A thermal switch 116 (TS1) is located next to the heater element 117 and is wired in series to prevent over heating of the system and the volatile process gas and liquid source. This novel heat transfer design allows for precise temperature control of the liquid source and process gas vapor phase and can accurately maintain the desired vapor pressure and delivery rate of volatile process gas, e.g., hydrazine or hydrogen peroxide.

Thus, as shown by the embodiments depicted in FIG. 1, the devices, systems, and methods described herein provide safe delivery of dangerous and unstable process gases due to the advanced membrane and mass transfer design. The efficiency of vaporization and heat transfer limits the quantity of liquid source required in the system at any given time while not sacrificing high mass flow rates of the volatile process gas, e.g., hydrazine.

Because the solvent is typically non-volatile relative to the process gas, and may not permeate the membrane, the real-time vapor mass flow rate is obtained from the difference of liquid mass flow rates in and out of the system. The mass flow rate of volatile process gas is directly controlled by liquid inlet mass flow rate, inlet feed concentration, vapor pressure of the volatile process gas, temperature of the liquid solution, carrier gas flow rate, and carrier gas pressure.

Figure 2:
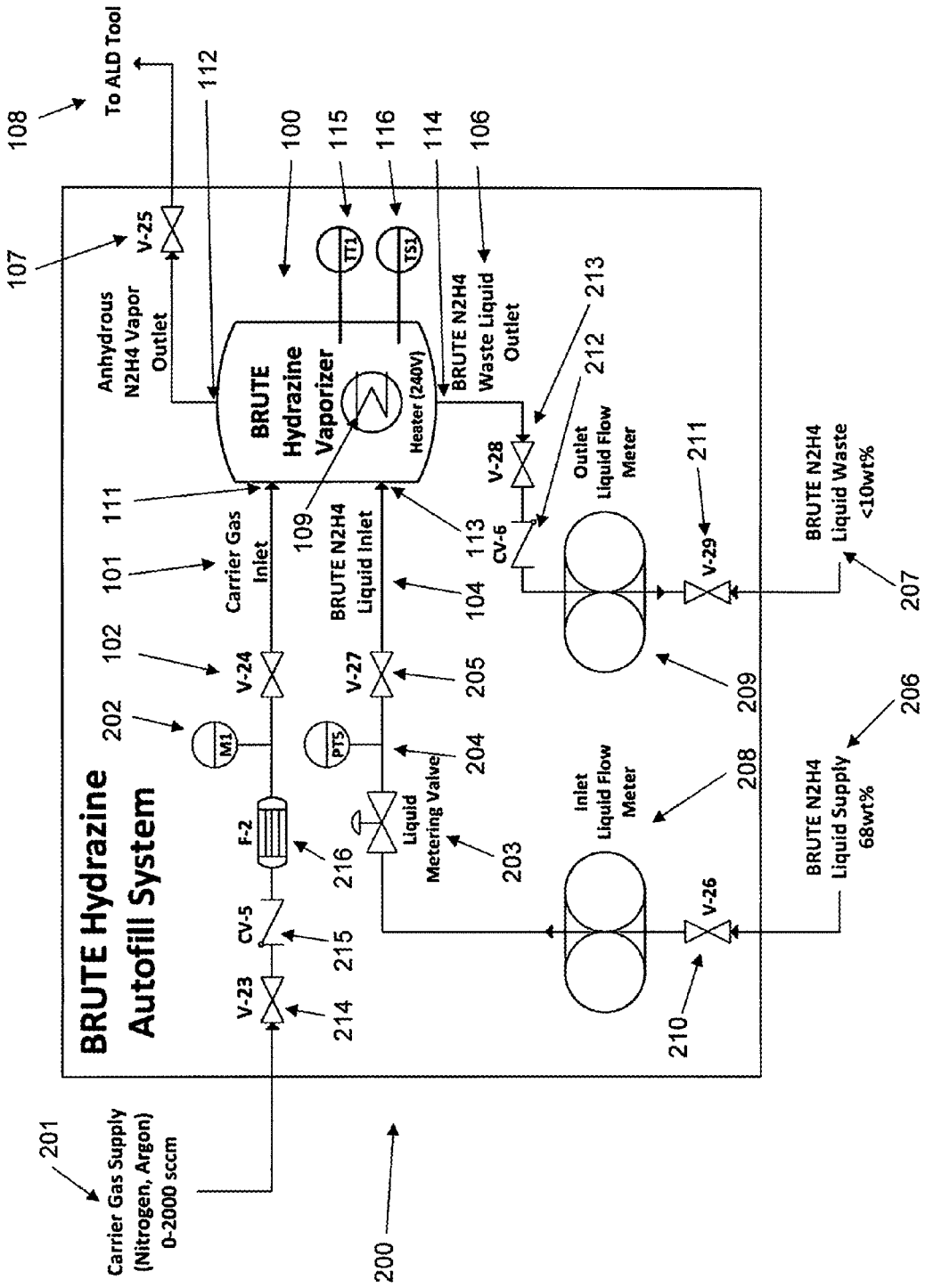
FIG. 2 is a P&ID of a manifold illustrating certain embodiment of the methods, systems, and devices disclosed herein, wherein the embodiments involve delivering hydrazine in the vapor phase to an atomic layer deposition (ALD) process.
Figure 3:
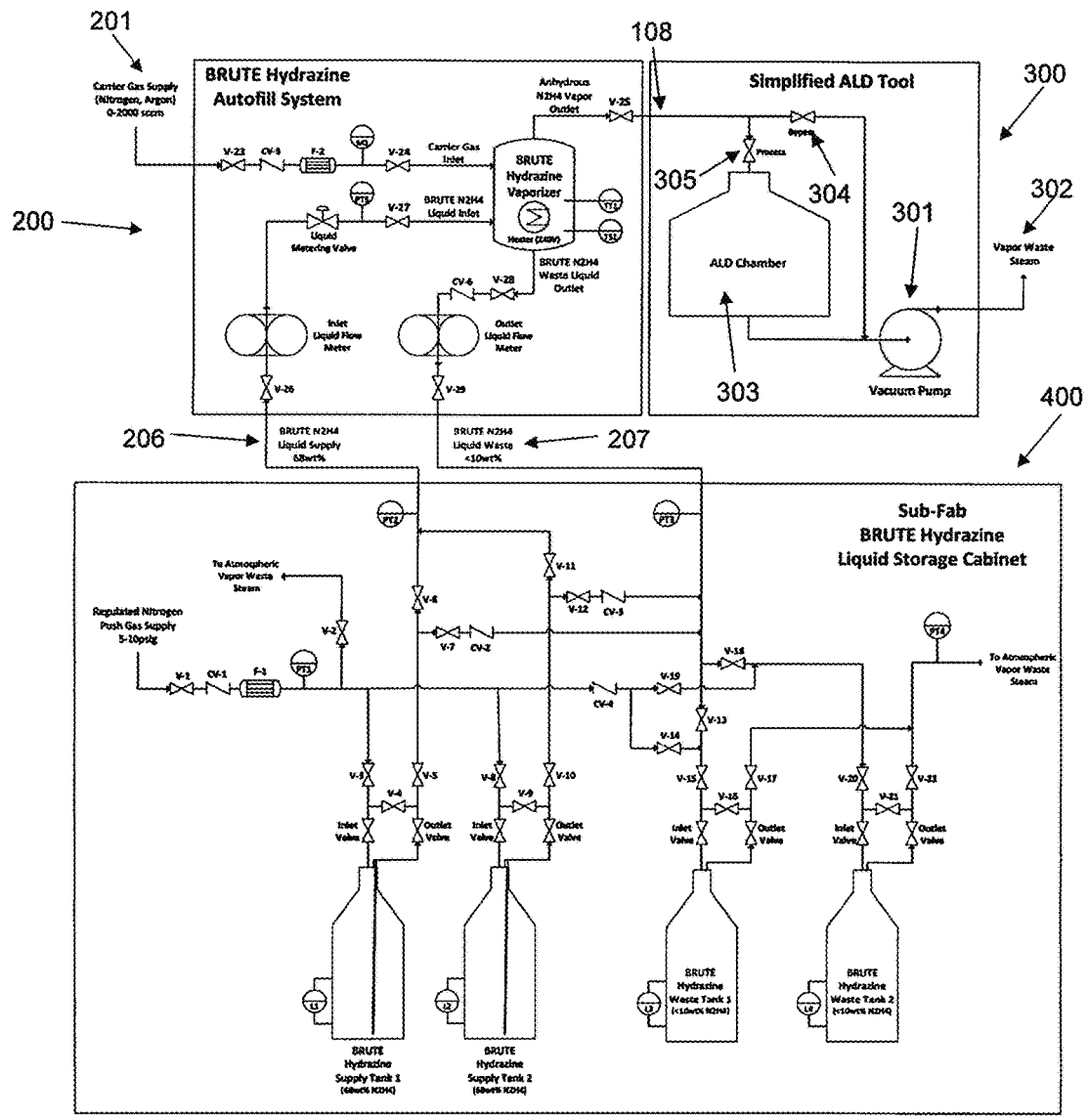
FIG. 3 is a P&ID illustrating certain exemplary embodiments of the methods, systems, and devices disclosed herein, wherein the embodiments involve delivering hydrazine in the vapor phase to an atomic layer deposition (ALD) process.

FIGS. 2 and 3 illustrate certain embodiments of the devices, systems, and methods disclosed herein wherein a volatile process gas, e.g., hydrazine, is delivered to a critical process application, e.g., an ALD process chamber, from a process gas delivery device that is continuously supplied with a liquid source solution, e.g., hydrazine in a non-aqueous solution, such as an organic solvent.

A process gas delivery device and system 200, in which hydrazine is an exemplary process gas, are depicted in FIG. 2. Process gas delivery device 100 is equivalent or analogous to the process gas delivery device shown in FIG. 1. A process gas containing liquid source solution 206 (68 wt. % hydrazine in a non-aqueous solvent) is delivered to process gas delivery device 100 via valve 210 (V-26), inlet liquid flow meter 208, liquid metering valve 203, and valve 205 (V-27). Pressure transducer 204 (PT5) monitors the pressure in liquid source inlet line 104. The liquid source solution 206 enters process gas delivery device 100 through hydrazine liquid inlet port 113. Heater 109 maintains the temperature of liquid source solution 206 in process gas delivery device 100. The optimum temperature will be determined according to the operating particular process conditions and process gas containing liquid source. As in the process gas delivery device depicted in FIG. 1, temperature transducer 115 (TT1) and temperature switch 116 (TS1) controls the operation the heater 109.

In embodiments depicted by FIG. 2, the process gas delivery device includes an optional substantially gas impermeable membrane that is permeable to hydrazine, which is vaporized across the membrane and into the head space of the process gas delivery device 100. Hydrazine vapor is carried out of process gas delivery device 100 by a carrier gas 201 from carrier gas inlet line 101, entering process gas delivery device 100 through carrier gas inlet port 111 via valve 214 (V-23), check valve 215 (CV-5), filter 216 (F-2), and valve 102 (V-24). Mass flow controller 202 (M1) monitors the flow rate of carrier gas 201. Hydrazine-containing carrier gas 108 exits process gas delivery device 100 through gas outlet port 112, via valve 107 (V-25). The waste stream of the liquid source 207, which comprises a solution of less than 10 wt. % hydrazine in an organic solvent, exits process gas delivery device 100 through liquid source outlet port 114. In this example, liquid source waste stream 207 is carried away through waste stream line 106 via valve 213 (V-28), check valve 212 (CV-6), liquid flow meter 209, and valve 211 (V-29).

Figure 4:
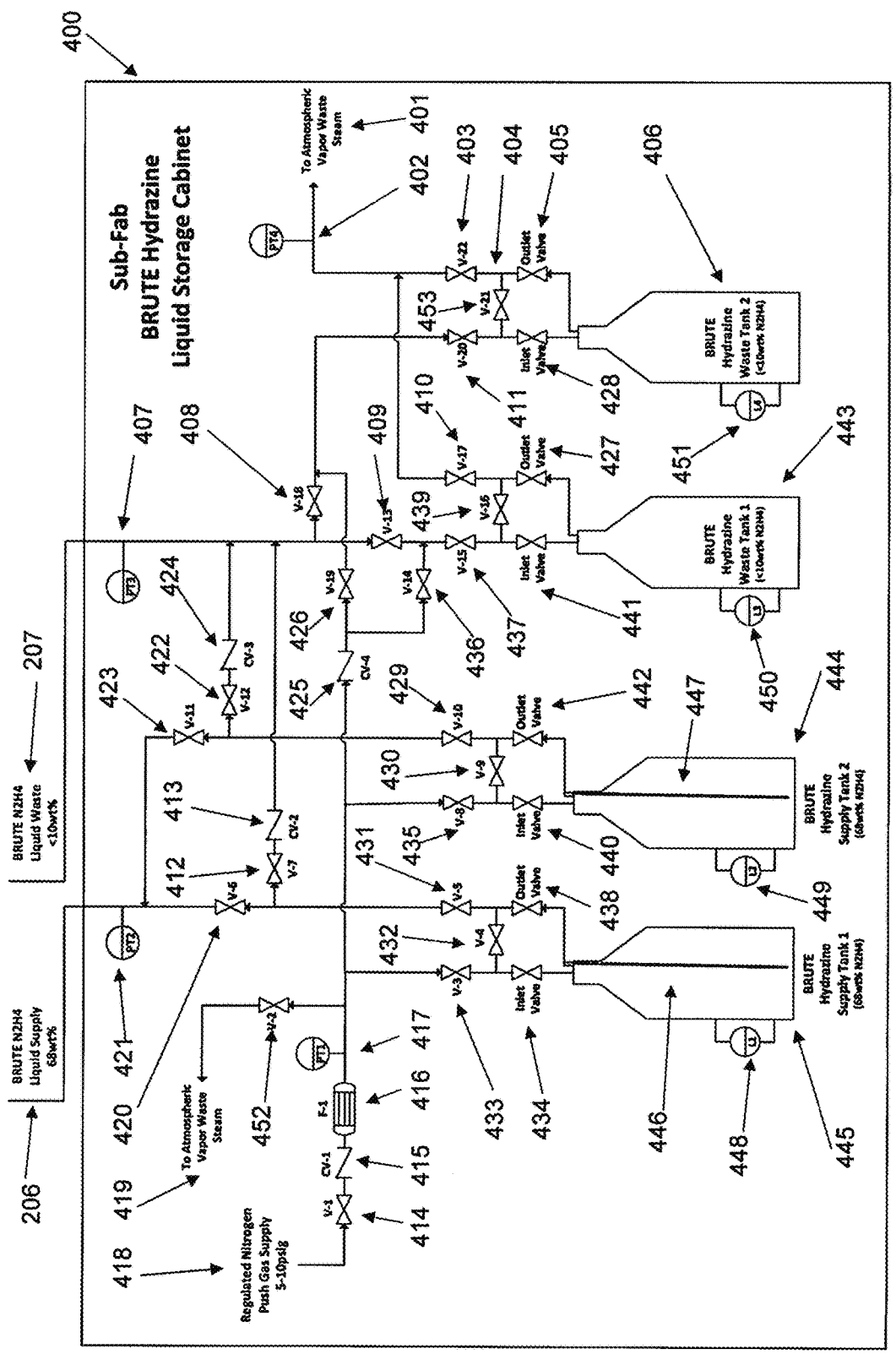
FIG. 4 is a P&ID illustrating certain exemplary embodiments of the methods, systems, and devices disclosed herein, particularly greater detail of the liquid handling system and devices shown in FIG. 3.

FIG. 3 depicts certain embodiments of a process gas delivery system that includes the process gas delivery device 100 and system 200 of FIG. 2, an ALD tool 300, and a standalone liquid source handling device and system 400 shown in FIG. 4. The ALD tool 300 shown in FIG. 3 is a simplified depiction of an ALD system. As shown in FIG. 3, process gas (e.g., hydrazine) containing carrier gas 108 from process gas delivery system 200 is delivered to ALD chamber 303 via process valve 305. Vacuum pump 301 controls the pressure in ALD chamber 303 and vents to a vapor waste stream 302. Hydrazine-containing process gas 108 can also bypass ALD chamber 303 through bypass valve 304.

In the embodiments depicted by FIG. 3, liquid handling device 400 provides process gas containing liquid source solution 206, e.g., a solution comprising 68 wt. % hydrazine in an organic solvent, to process gas delivery device 100 and system 200. In this example, liquid handling device 400 also receives and stores liquid source waste stream 207, e.g., a solution comprising less than 10 wt. % hydrazine in an organic solvent.

FIG. 4 further illustrates liquid handling device 400 of the devices, systems, and methods depicted by FIG. 3. As shown in FIG. 4, the liquid source solution 206 is contained in liquid source storage vessels 444 and 445 of liquid handling device 400. Liquid source solution 206, e.g., a solution comprising 68 wt. % hydrazine in an organic solvent, exits storage vessels 444 and 445 through dip tubes 446 and 447 and flows through outlet valves 438 and 442. In this example, inert gas supply 418 provides pressure forcing the liquid source solution through dip tubes 446 and 447 and filling storage vessels 444 and 445 with inert gas as they are emptied of liquid source solution. Inert gas from inert gas supply 418 flows through valve 414 (V-1), check valve 415 (CV-1), and filter 416 (F-1) before reaching valves 433 (V-3) and 435 (V-8) and inlet valves 434 and 440 that feed inert gas into storage vessels 444 and 445. Pressure transducer 417 (PT1) monitors the pressure of the inert gas supply line. Valves 432 (V-4) and 430 (V-9) may be opened to balance the pressure between the inlet and outlet of each storage vessel, which stops the flow of liquid source solution. The liquid source side of liquid handling device 400 can be vented or purged to an atmospheric pressure vapor waste 419 through valve 452 (V-2). Liquid level sensors 448 (L1) and 449 (L2) monitor the level of liquid source solution 206 in storage vessels 444 and 445. Liquid source solution passes through valves 420 (V-6) and 423 (V-11) to be fed into a process gas delivery device 100 and/or system 200. Pressure transducer 421 monitors the pressure of the liquid source solution supply line.

After passing through process gas delivery device 100 and system 200, the waste stream from the liquid source solution 207 is fed back into the liquid source handling device 400. The liquid source waste stream 207 enters waste storage vessels 406 and 443 through valves 408 (V-18) and 409 (V-18) and then valves 411 (V-20) and 437 (V-15) and then inlet valves 428 and 441. Inert gas from the inert gas supply 418 can be used to purge the waste stream handling lines and/or waste storage vessels 406 and 443 through check valve 425 (CV-4) and valves 426 (V-19) and 436 (V-14). Gases can be vented from waste storage vessels 406 and 443 through outlet valves 427 and 405 and valves 410 (V-17) and 403 (V-22) to atmospheric pressure waste stream 401. Valves 439 (V-16) and 453 (V-21) can be used to balance the pressure between the inlet and outlet of each waste storage vessel. Pressure transducer 407 (PT3) measures the pressure of liquid source waste stream 207 coming from process gas delivery system 200, and pressure transducer 402 (PT4) measures the pressure of the vent stream from the waste storage vessels. If necessary to purge the liquid source solution or to diverted the flow of liquid source solution, liquid source solution 206 can flow into waste storage vessels 406 and 443 through valve 412 (V-7) and check valve 413 (CV-2) and/or valve 422 (V-12) and check valve 424 (CV-3).

Figure 5:
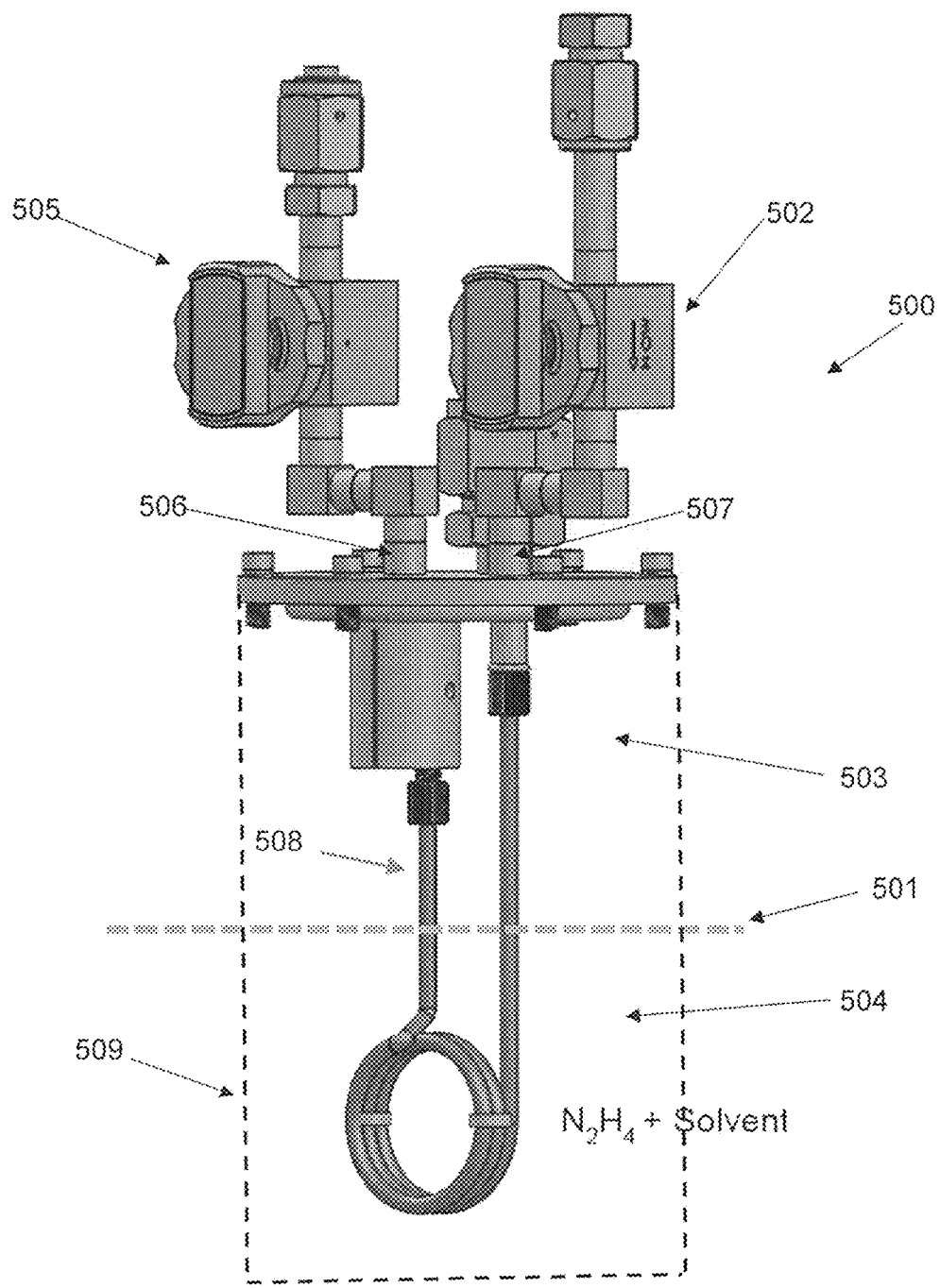
FIG. 5 is a diagram illustrating certain embodiments of the devices, systems, and methods disclosed herein for delivering hydrazine in the vapor phase.
Figure 6:
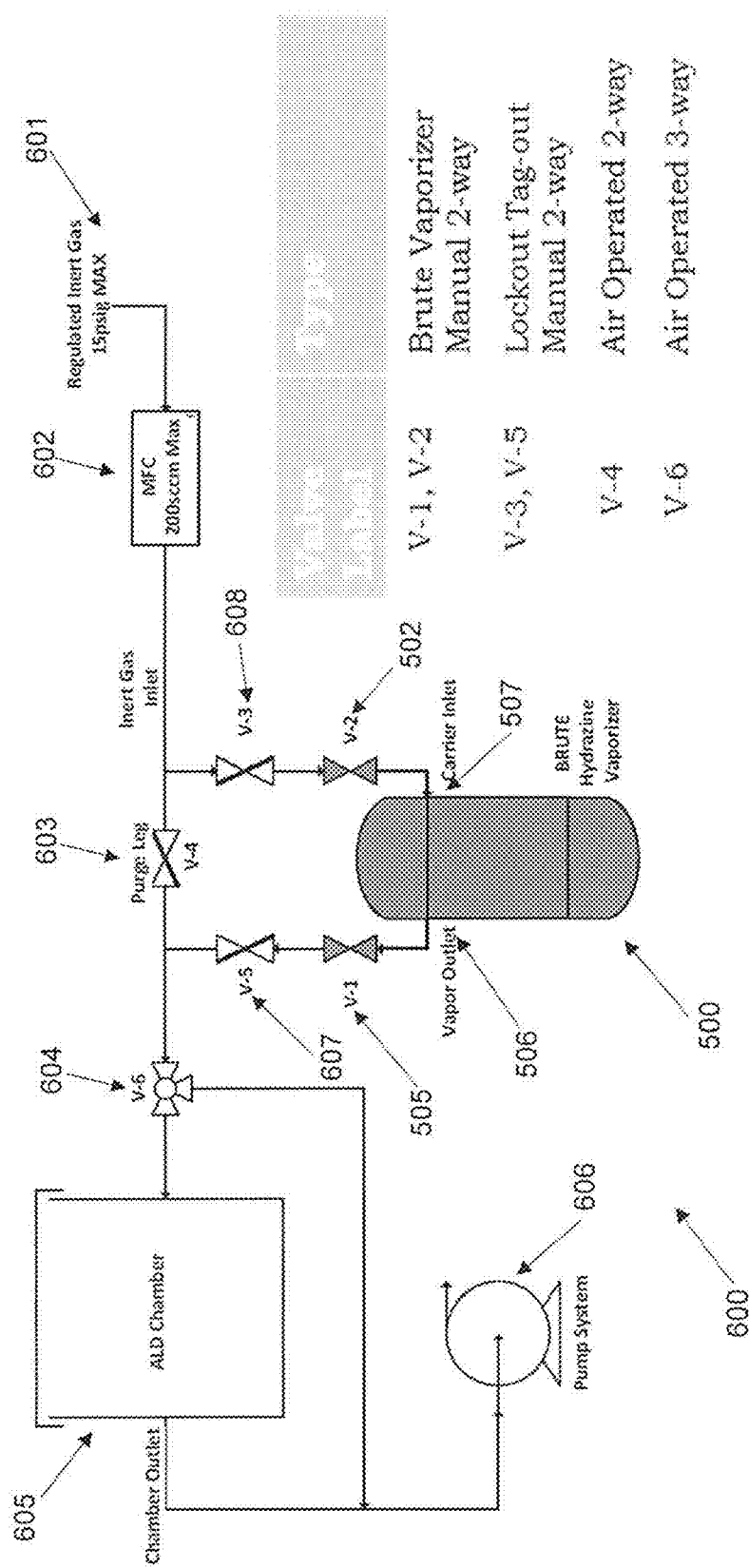
FIG. 6 is a P&ID of a manifold illustrating certain embodiments of the methods, systems, and devices disclosed herein, wherein the embodiments involve delivering hydrazine in the vapor phase to an atomic layer deposition (ALD) process.

FIGS. 5 and 6 depict another aspect of certain embodiments of the devices, systems, and methods disclosed herein that do not include an autofill capability. As shown in FIG. 5, a process gas delivery device 500 comprises a process gas containing liquid source solution 504, e.g., a solution comprising hydrazine in an organic solvent, contained in a housing outlined as 509. Process gas delivery device 500 includes a tubular, wound ion exchange membrane 508 (e.g., NAFION®) separating liquid source solution 504 from a head space inside membrane 508 through which a carrier gas flows. Dashed line 503 indicates the fill line of liquid source 501 in device 500. In this example, the membrane is a tubular shape and is attached to carrier gas inlet port 507 and process gas containing carrier gas outlet port 506. Flow of carrier gas into device 500 is controlled by valve 502, and flow of process gas containing carrier gas out of device 500 is controlled by valve 505. Process gas (e.g., hydrazine) from liquid source solution 504 passes through membrane 508 into the head space. Process gas containing carrier gas is then provided to a critical process application.

As shown in FIG. 6, process gas delivery device 500 depicted in FIG. 5 can be used in a system 600 for providing a process gas, e.g., hydrazine, to a critical process application, e.g., an ALD process. Carrier gas from inert gas supply 601 passes through mass flow controller 602 and valve 608 (V-3) and valve 502 (V-2) before entering the process gas delivery device 500 through carrier gas inlet port 507. Process gas containing carrier gas exits process gas delivery device 500 through outlet port 506 and passes through valve 505 (V-1) and 607 (V-5) to ALD chamber 605 through 3-way valve 604 (V-6). Alternatively, process gas containing carrier gas can bypass ALD chamber 605 by switching three-way valve 604 (V-6). Pump system 606 maintains the reduce pressure in ALD chamber 605, and in the head space of process gas delivery device 500. As needed, purge valve 603 (V-4) can be opened to provide carrier gas free of process gas from inert gas supply 601 to purge ALD chamber 605 and/or the process gas delivery lines.

Example 1

Figure 7:
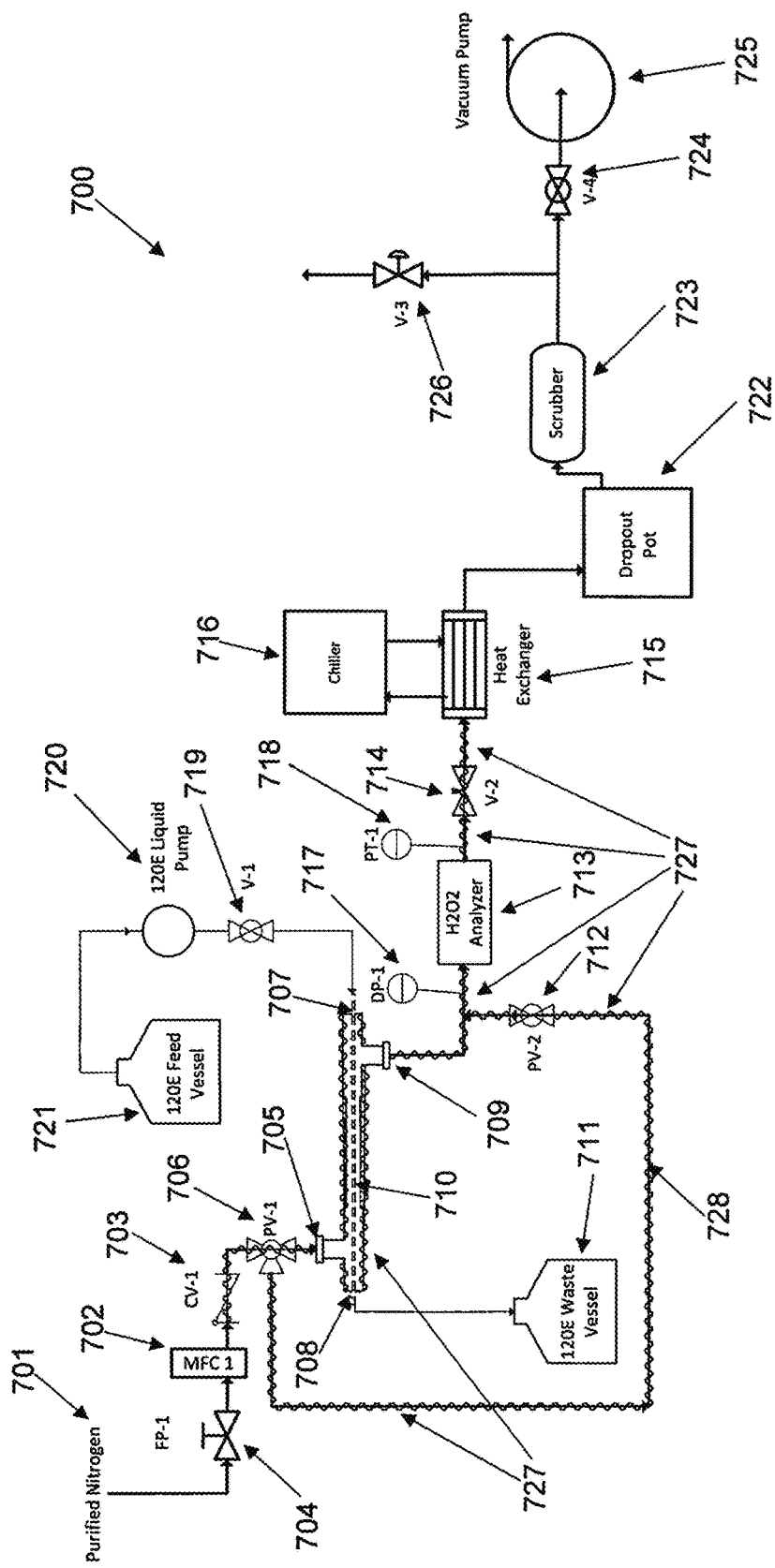
FIG. 7 is a is a P&ID of a manifold used to test certain embodiments of the methods, systems, and devices disclosed herein.

FIG. 7 depicts an apparatus 700 used to test certain embodiments of the devices, systems, and methods disclosed herein. The apparatus shown in FIG. 7 could be used to test embodiments for the delivery of any volatile process gas, such as hydrazine or hydrogen peroxide. In this example, hydrogen peroxide was delivered from a hydrogen peroxide containing liquid source solution, specifically a solution comprising 28 wt. % hydrogen peroxide in an organic solvent with a stabilizer.

Liquid source solution from liquid source storage feed vessel 721 was pumped by liquid source pump 720 (Bio-Chem Fluidics, Boonton, N.J., USA, Solenoid Operated Micro-Pump) through valve 719 (V-1) into process gas delivery device 710 through liquid source inlet 707. In this example, process gas delivery device 710 comprises a single lumen of tubular membrane through which the liquid source solution flows. The lumen is attached to liquid source inlet 707 and liquid source outlet 708. Liquid source solution flowed through the lumen and vaporized across the membrane, which was made of NAFION® in this example, into the carrier gas containing head space of process gas delivery device 710. The liquid source waste stream exited the process gas delivery device through liquid source outlet 708 and is directed into liquid source waste stream vessel 711.

Nitrogen carrier gas flowed through the head space of process gas delivery device 710 in the opposite direction to the flow of the liquid source solution through the lumen in process gas delivery device 710. Nitrogen from carrier gas source 701 flowed through pressure regulator 704 (FP-1), mass flow controller 702 (MFC1) (Brooks Instrument, Hatfield, Pa., USA, SLA5850 S-Series), check valve 703 (CV-1), and 3-way valve 706 (PV-1) into the head space of process gas delivery device 710 through gas inlet 705. In the head space, the carrier gas mixed with hydrogen peroxide vapor that passed through the membrane from the hydrogen peroxide containing liquid source solution and exited process gas delivery device 710 from gas outlet 709. After exiting process gas delivery device 710, the hydrogen peroxide containing process gas stream enters hydrogen peroxide analyzer 713 (Teledyne Analytical Instruments, City of Industry, Calif., USA). Dew point monitor 717 (DP-1) can be optionally used in system 700, particularly when the system is purge or tested with water or an aqueous solution. Pressure transducer 718 (PT-1) was used to monitor the pressure of the gas stream exiting hydrogen peroxide analyzer 713.

Process gas delivery device 710 and the gas handling pipes leading to and from process gas delivery device 710 and hydrogen peroxide analyzer 713, up to heat exchanger 715, were covered with heater tape 727 to maintain the temperature of the process gas delivery device 710 and the test environment. In addition, thermocouples were attached to the apparatus at various positions to monitor the temperature of the apparatus.

The effluent from hydrogen peroxide analyzer 713 was cooled by flowing through valve 714 (V-2) into heat exchanger 715 attached to recirculatory chiller 716 (Polyscience, Niles, Ill., USA). Pressure transducer 718 (PT-1) was used to monitor the pressure of the effluent from hydrogen peroxide analyzer 713. After cooling, the effluent flowed through dropout pot 722 to remove condensed liquids and the remaining gases flowed through scrubber 723 to remove residual hydrogen peroxide vapor. The effluent from scrubber 723 was either vented through valve 726 (V-3) when operating the test apparatus under atmospheric pressure or through valve 724 (V-4) and vacuum pump 725 when operating the test apparatus under reduced pressure.

When needed to purge hydrogen peroxide analyzer 713 and establish a zero setting, 3-way valve 706 (PV-1) is set to route carrier gas through bypass line 728, while valve 712 (PV-2) is open and valve 719 (V-1) is closed.

Figure 8A:
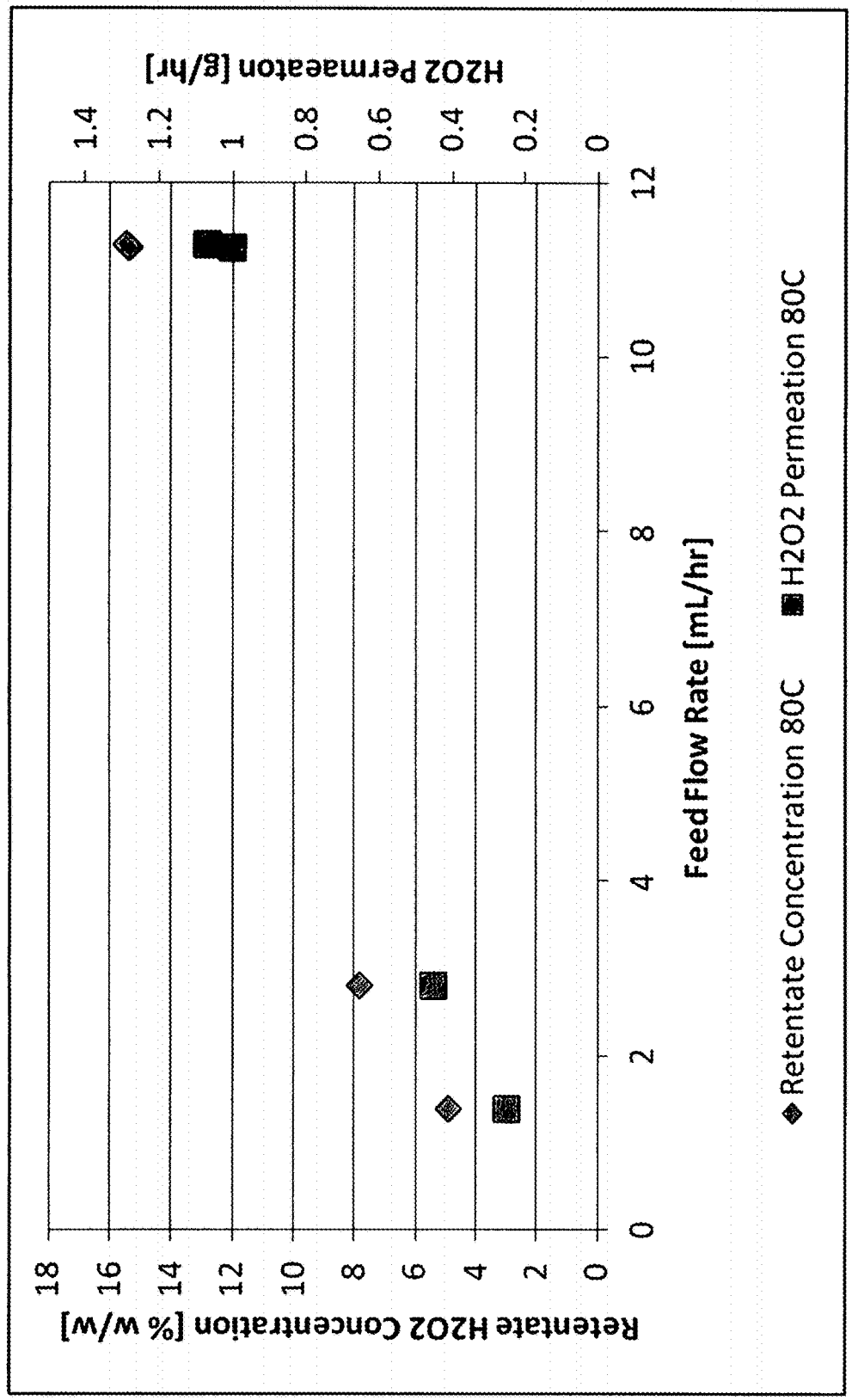
FIG. 8A is a chart plotting results from employing the methods, systems, and devices disclosed herein in embodiments for delivering hydrogen peroxide.

In this example, hydrogen peroxide delivery at atmospheric pressure was tested while varying the temperature of the process gas delivery device and the flow rate of hydrogen peroxide containing liquid source solution. Valve 724 (V-4) was closed and vacuum pump 725 was not used, while valve 726 (V-3) was opened as an atmospheric pressure system vent. The length of the NAFION® lumen was held constant. Each test run involved delivering hydrogen peroxide for at least 60 minutes. The test was repeated at least 2 times at each temperature setting (i.e., 40° C., 60° C., and 80° C.) and liquid source flow rates. The carrier gas flow rate was 1 standard liter per minute (slm) at 25 psig set by pressure regulator 704 (FP-1) and mass flow controller 702 (MFC-1). After each test run, the concentration of hydrogen peroxide in the liquid source waste stream was determined by redox titration. The mass of hydrogen peroxide vapor delivered by the process gas delivery device was calculated by subtracting the mass of hydrogen peroxide in the liquid source waste stream from the mass of hydrogen peroxide in the liquid source that passed through the process gas delivery device. The average hydrogen peroxide diffusion rate was calculated by dividing the mass of hydrogen peroxide delivered by the time of operation. The results of these tests are summarized in the table FIG. 8B. As shown by the plot in FIG. 8A, the process gas delivery device consistently delivered hydrogen peroxide process gas at 80° C.

Example 2

In Example 2, the apparatus shown in FIG. 7 was used to test certain embodiments operated at reduced pressure while varying the temperature of the process gas delivery device, flow rate of hydrogen peroxide containing liquid source solution, NAFION® lumen length, and carrier gas flow rate. Valve 726 (V-3) was closed and valve 724 (V-4) was open with vacuum pump 725 set to 200 Torr. Each test run involved delivering hydrogen peroxide for at least 60 minutes. The test was repeated at least 2 times at each temperature setting (i.e., 60° C. and 80° C.).

Figure 9A:
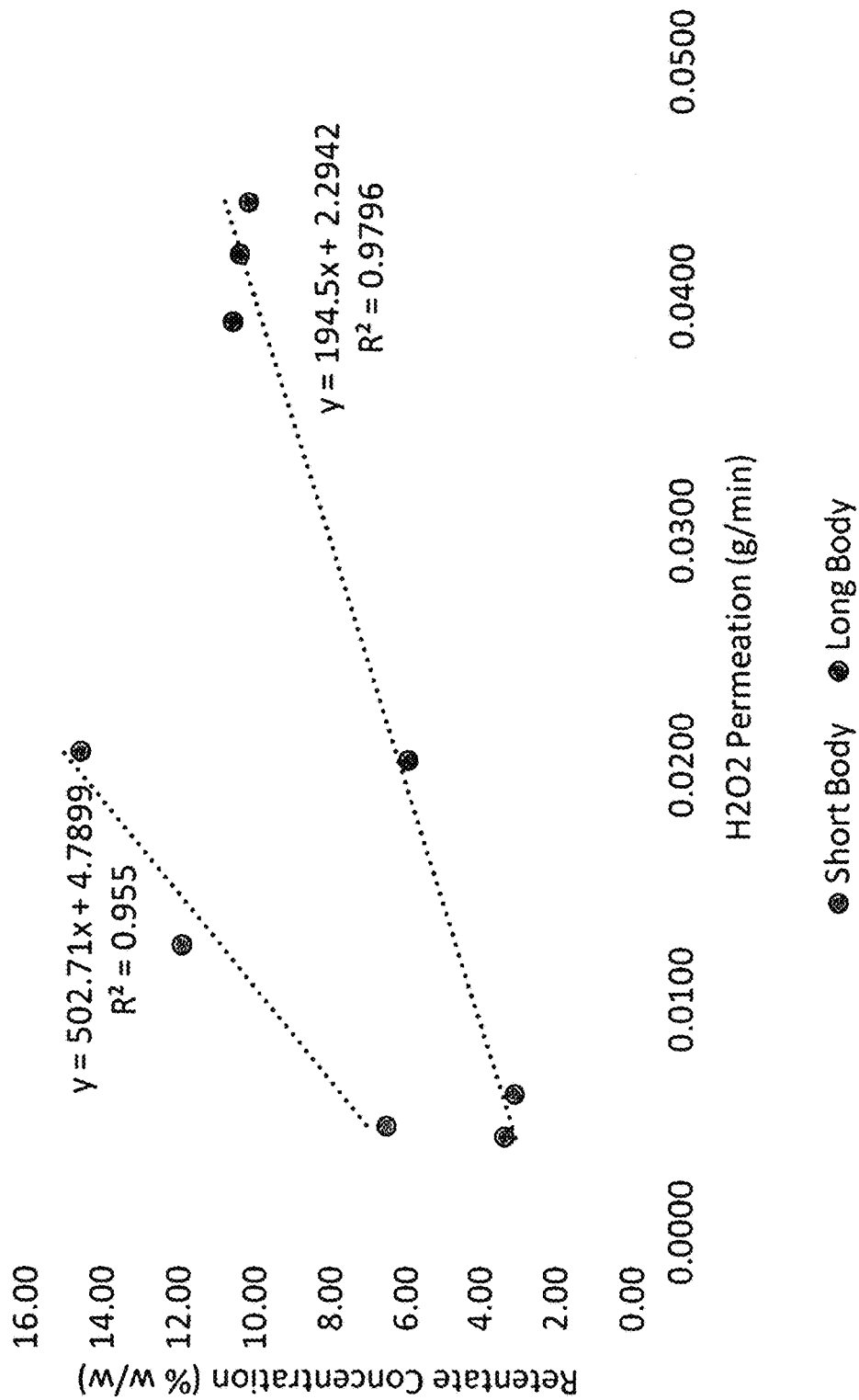
FIG. 9A is a chart plotting results from employing the methods, systems, and devices disclosed herein in embodiments for delivering hydrogen peroxide.

The results of these tests are summarized in the table FIG. 9B. As shown by the plot in FIG. 9A, the process gas delivery device consistently delivered hydrogen peroxide process gas at 80° C.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process gas delivery device, comprising:
(a) a housing comprising a heater in thermal contact with a liquid source, wherein the liquid source comprises at least one process chemical and a solvent;
(b) a first inlet port of the housing configured to continuously flow the liquid source into the housing;
(c) a first outlet port of the housing configured the continuously flow a liquid waste stream out of the housing;
(d) controller configured for controlling the temperature of the heater;
(e) a second inlet port of the housing configured to continuously flow a carrier gas into a head space of the housing; and
(f) a second outlet port of the housing configured to continuously flow a mixed gas stream comprising the carrier gas and the at least one component of the liquid source in the vapor phase out of the housing, wherein the device is configured to deliver a substantially constant mass flow rate of the at least one component in the mixed gas stream.

2. The device of claim 1, wherein the liquid source is selected from the group consisting of non-aqueous hydrazine solutions and non-aqueous hydrogen peroxide solutions.

3. The device of claim 2, wherein the liquid source is separated from the vapor phase by at least one substantially gas impermeable membrane.

4. The device of claim 2, wherein the liquid source is separated from the vapor phase by at least one ion exchange membrane.

5. The device of claim 4, wherein the at least one membrane is a tubular shaped lumen attached to the first inlet port and the first outlet port.

6. The device of claim 5, wherein a gap between the tubular shaped lumen and the wall of the housing forms the head space.

7. The device of claim 2, wherein the carrier gas is separated from at least part of the liquid source by a substantially gas impermeable membrane and is not separated from at least part of the liquid source in the head space.

8. The device of claim 2, wherein the carrier gas and the liquid source flow in opposite directions.

9. A process gas delivery method, comprising:
(a) providing a constant flow of a liquid source comprising at least one component and a solvent, through the housing of the device of claim 1;
(b) controlling the relative concentration of the at least one component in the vapor phase by adjusting the temperature of the heater;
(c) providing a constant flow of a carrier gas or vacuum through the housing such that the carrier gas or vacuum contacts the vapor phase to form a mixed gas stream; and
(d) delivering the mixed gas stream to a critical process.

10. The method of claim 9, wherein the liquid source is selected from the group consisting of non-aqueous hydrazine solutions and non-aqueous hydrogen peroxide solutions.

11. The method of claim 10, wherein the liquid source is separated from the vapor phase by at least one substantially gas impermeable membrane.

12. The method of claim 10, wherein the liquid source is separated from the vapor phase by at least one ion exchange membrane.

13. The method of claim 11, wherein the at least one membrane is a tubular shaped lumen attached to the first inlet port and the first outlet port.

14. The method of claim 13, wherein a gap between the tubular shaped lumen and the wall of the housing forms the head space.

15. The method of claim 10, wherein the carrier gas is separated from at least part of the liquid source by a substantially gas impermeable membrane and is not separated from at least part of the liquid source in the head space.

16. The method of claim 15, wherein the substantially gas impermeable membrane is an ion exchange membrane.

17. The method of claim 10, wherein the carrier gas and the liquid source flow in opposite directions.

18. The method of claim 10, wherein the liquid source flows through the housing continuously during delivery of process gas.

19. The method of claim 10, wherein the temperature of the liquid source is in the range of about 30° C. to about 120° C.

20. The method of claim 10, wherein the temperature of the liquid source is in the range of about 40° C. to about 100° C.

21. The method of claim 10, wherein the temperature of the liquid source is in the range of about 60° C. to about 80° C.

22. The method of claim 10, wherein the concentration of process gas stream delivered in step (d) is between about 2000 parts per million (ppm) and the saturation point of the process gas at the temperature of the gas stream.

23. The method of claim 22, wherein the concentration of hydrogen peroxide in the gas stream delivered in step (d) is at least about 5000 ppm.

24. The method of claim 22, wherein the concentration of hydrogen peroxide in the gas stream delivered in step (d) is at least about 10,000 ppm.

25. The method of claim 22, wherein the concentration of hydrogen peroxide in the gas stream delivered in step (d) is at least about 15,000 ppm.

26. The method of claim 22, wherein the concentration of hydrogen peroxide in the gas stream delivered in step (d) is at least about 30,000 ppm.

27. The method of claim 22, wherein the concentration of hydrogen peroxide in the gas stream delivered in step (d) is in the range of about 5,000 ppm to about 100,000 ppm.

28. The device of claim 5, wherein the tubular shaped lumen is formed into a helical coil, loop, straight path or braided assembly disposed around or in contact with the heater.

\* \* \* \* \*

UNITED STATES PATENT AND TRADEMARK OFFICE
CERTIFICATE OF CORRECTION

PATENT NO. : 10,363,497 B2
APPLICATION NO. : 15/437892
DATED : July 30, 2019
INVENTOR(S) : Spiegelman et al.

It is certified that error appears in the above-identified patent and that said Letters Patent is hereby corrected as shown below:

In the Claims

At Column 19, Lines 59-60, in Claim 1, please replace:
 "(d) controller configured for controlling the temperature of the heater;"
With the following:
 --(d) a controller configured for controlling the temperature of the heater;--

At Column 19, Lines 64-67, in Claim 1, please replace:
 "(f) a second outlet port of the housing configured to continuously flow a mixed gas stream comprising the carrier gas and the at least one component of the liquid source in the vapor phase out of the housing,"
With the following:
 --(f) a second outlet port of the housing configured to continuously flow a mixed gas stream comprising the carrier gas and the at least one process chemical of the liquid source in the vapor phase out of the housing,--

Signed and Sealed this
Twelfth Day of November, 2019

Andrei Iancu
*Director of the United States Patent and Trademark Office*